United States Patent [19]

McPherson et al.

[11] 4,455,876
[45] Jun. 26, 1984

[54] PRECISION MANOMETER GAUGE

[75] Inventors: Malcolm J. McPherson, Lafayette; Robert A. Bellman, Berkeley, both of Calif.

[73] Assignee: The United States of America as represented by the United States Department of Energy, Washington, D.C.

[21] Appl. No.: 425,144

[22] Filed: Sep. 27, 1982

[51] Int. Cl.³ .............................................. G01L 7/18
[52] U.S. Cl. .......................................................... 73/747
[58] Field of Search .................. 73/747, 748, 749, 750

[56] References Cited

U.S. PATENT DOCUMENTS

| | | | |
|---|---|---|---|
| 1,699,812 | 1/1929 | Sartakoff | 73/747 |
| 2,411,508 | 11/1946 | Dwyer | 73/747 |
| 2,714,819 | 8/1955 | Clark | 73/212 |
| 2,872,814 | 2/1959 | Brown | 73/747 |
| 2,942,466 | 6/1960 | Barron et al. | 73/749 |
| 2,983,146 | 5/1961 | Wilson | 73/747 |
| 3,025,405 | 3/1962 | Dadas | 73/749 |
| 3,134,262 | 5/1964 | Dworzan et al. | 73/749 |
| 3,182,509 | 5/1965 | Kendall et al. | 73/747 |
| 3,405,560 | 10/1968 | Sorteberg | 73/747 |
| 3,473,387 | 10/1969 | Meriam | 73/747 |
| 3,611,811 | 3/1970 | Lissau | 73/747 |
| 3,831,448 | 8/1974 | Kors et al. | 73/747 |

Primary Examiner—Donald O. Woodiel
Attorney, Agent, or Firm—L. E. Carnahan; Roger S. Gaither; Michael F. Esposito

[57] ABSTRACT

A precision manometer gauge which locates a zero height and a measured height of liquid using an open tube in communication with a reservoir adapted to receive the pressure to be measured. The open tube has a reference section carried on a positioning plate which is moved vertically with machine tool precision. Double scales are provided to read the height of the positioning plate accurately, the reference section being inclined for accurate meniscus adjustment, and means being provided to accurately locate a zero or reference position.

8 Claims, 5 Drawing Figures

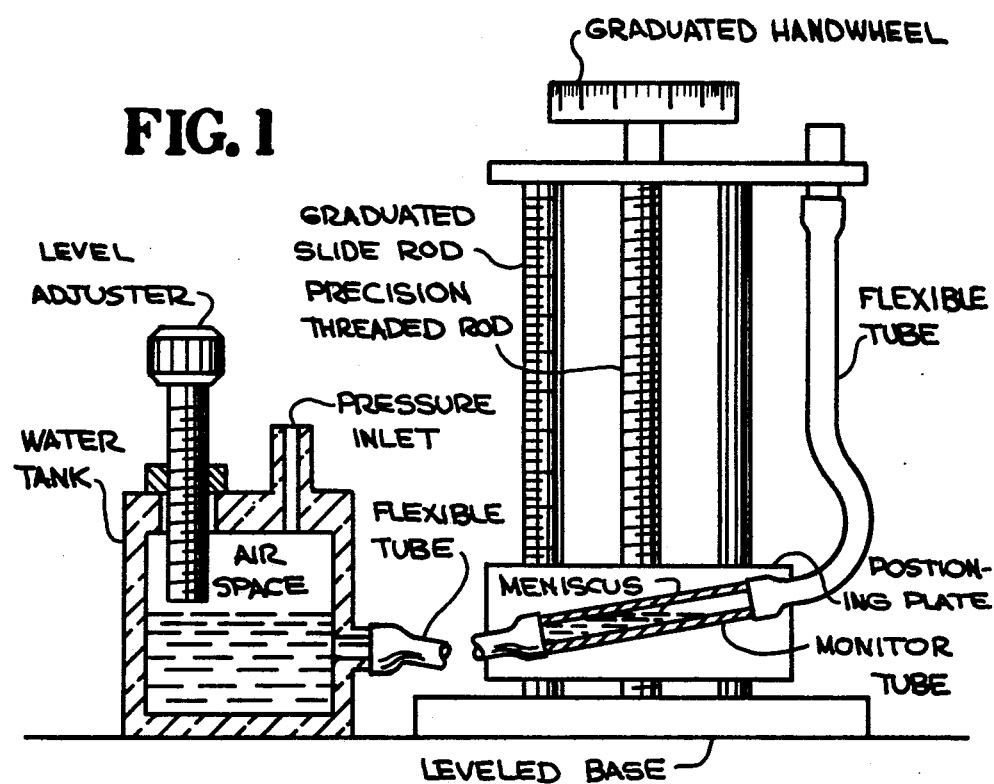
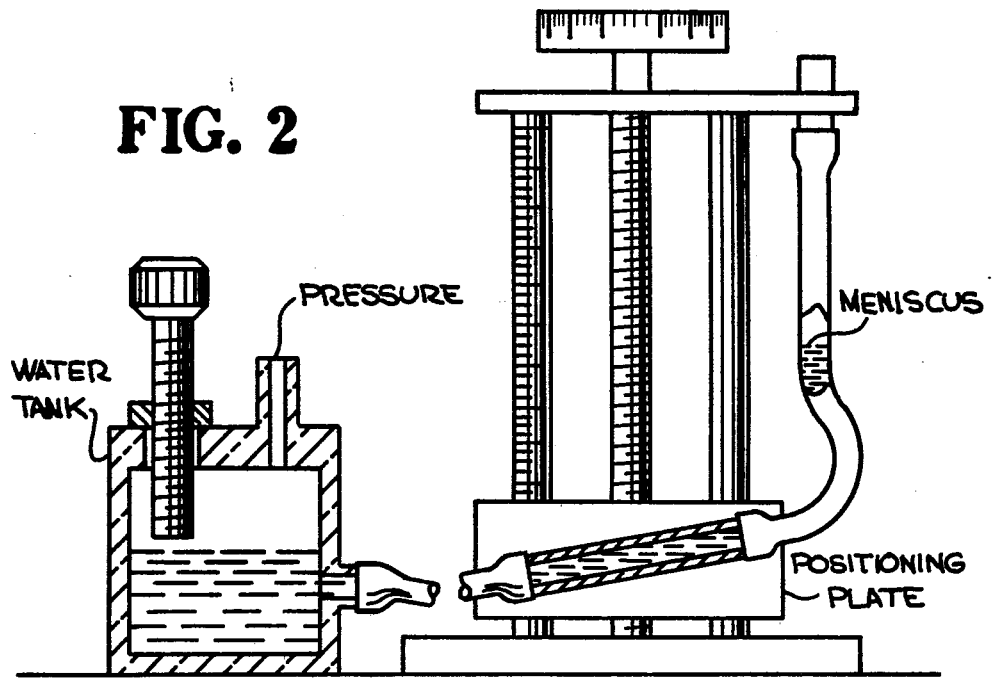

PRECISION MANOMETER GAUGE

BACKGROUND OF THE INVENTION

The invention described herein arose at the Lawrence Berkeley Laboratory in the course of, or under, Contract No. W-7405-ENG-48 between the U.S. Department of Energy and the University of California.

The present invention relates to manometers, particularly to a precision manometer gauge, and more particularly to a precision manometer that is a null reading instrument which need not be corrected due to ambient pressure changes or instrumental factors.

Manometers of various types are known in the art and are utilized for numerous measuring applications, which include the measurement of small positive air pressures. For example, air velocities in wind tunnels, heating ducts, and the like can be calculated from pressures sensed by pitot tubes or other appropriate pressure sensing devices. Devices known in the art for measuring these pressures are exemplified by U.S. Pat. Nos. 3,831,448 issued Aug. 27, 1974 to V. E. Kors, No. 3,611,811 issued Oct. 12, 1971 to F. Lissau, No. 3,473,387 issued Oct. 21, 1969 to C. Meriam, No. 3,182,509 issued May 11, 1965 to J. M. Kendall et al, No. 2,872,814 issued Feb. 10, 1959 to R. N. Brown, and No. 2,411,508 issued Nov. 26, 1946 to F. W. Dwyer.

Another known manometer is generally similar to above-referenced U.S. Pat. No. 3,473,387 except that it includes a pair of devices for measuring the liquid (water) levels in the chambers. Each of these measuring devices includes a rod having a needle associated therewith which is registered with the liquid surface on its chamber and its position is measured by a scale on the rod end having a handwheel thereon. However, it can measure differences of only a few inches of water.

These prior devices have limited ranges and accuracies, and thus a need has existed for a manometer to obtain more accurate data for research purposes.

SUMMARY OF THE INVENTION

The present invention fills the above-mentioned need by providing a precision manometer gauge that is capable of measuring positive pressures up to about 18 inches of water, and thus is very useful in research work where accurate measurements of such pressures are required.

An important feature of the invention is that it is a null reading instrument. That is the liquid levels remain constant within the instrument irrespective of the pressure difference being measured. The instrument is a reference standard as water is used as the measuring media. Its sensitivity is not affected by the magnitude of the measurement.

Therefore, it is an object of this invention to provide a precision manometer gauge.

A further object of the invention is to provide a precision manometer gauge which locates a zero height and a measured height of liquid.

Another object of the invention is to provide a device capable of accurately measuring small positive air pressures.

Another object of the invention is to provide a precision manometer gauge which is null reading.

Another object of the invention is to provide a precision manometer gauge which uses water as the measuring media and its sensitivity is not affected by the magnitude of the measurement.

Other objects of the invention will become readily apparent to those skilled in the art in view of the following description and accompanying drawings.

The above-listed objects and advantages of the present invention are carried out by an apparatus which utilizes a difference manometer principle and measures the head of liquid, such as water, generated by the pressure being measured. The liquid head is carried in a tube having a reference section containing a marking. This reference section is carried on a movable plate, so that the liquid-air interface or meniscus can be located at the reference marking by movement of the movable plate. In order to improve accuracy, the reference section is inclined at a small angle from the horizontal so that relatively small vertical movement of the meniscus translates to a large transverse movement at the reference point or marking. The movable plate is carried in machine-tool like structures with appropriate measuring scales for providing accurate readings.

BRIEF DESCRIPTION OF THE DRAWINGS

FIGS. 1-3 schematically illustrate the general operation of a precision manometer gauge made in accordance with the present invention;

DETAILED DESCRIPTION OF THE INVENTION

The invention involves a precision manometer gauge which locates a zero height and a measured height of liquid, whereby small positive air pressures can be accurately measured. An essential feature of the invention is that it is of a null reading type. In addition, the invention is a reference standard as water is used as the measuring media, and its sensitivity is not affected by the magnitude of the measurement. Thus, the invention provides a manometer gauge for measuring positive pressures up to about eighteen inches of water.

Basically the invention is a precision manometer gauge having a liquid reservoir, a tube located in communication with the reservoir, means for communicating the pressure to be measured to the reservoir, means for adjusting the ambient zero point of the measuring means when the liquid is not under above ambient pressure, means for measuring the height of the liquid in said tube when the reservoir is in receipt of the pressure to be measured.

The measuring means comprises a vertically movable positioning plate to which a section of said tube is attached, a marking on said tube for indicating a liquid level, a graduated slide rod positioned to register with said positioning plate and provides a measuring scale therefor, an accurately machined screw means threadably engaged with the positioning plate for providing adjustable vertical movement to the positioning plate, and a graduated handwheel on said screw means for turning the screw and providing additional significant figures to the reading of the measuring scale as well as accurately locating the positioning plate.

Means are also provided for increasing the sensitivity of vertical movement of liquid through the tube at the measured location by adjusting the angle of the tube relative to the positioning plate.

More specifically, the apparatus of this invention utilizes a difference manometer principle and measures the head of liquid, such as water, generated by the pressure being measured. The liquid head is carried in the tube which has a reference section containing a marking. This reference section is carried on the movable positioning plate, so that the liquid-air interface or meniscus can be located at the reference marking by movement of the positioning plate. In order to improve accuracy, the reference section is inclined at an angle from the horizontal so that relatively small vertical movement of the meniscus translates to a large transverse movement at the reference section marking. The movable positioning plate is carried in machine-tool like structures with appropriate measuring scales for providing accurate readings.

Figure 3:
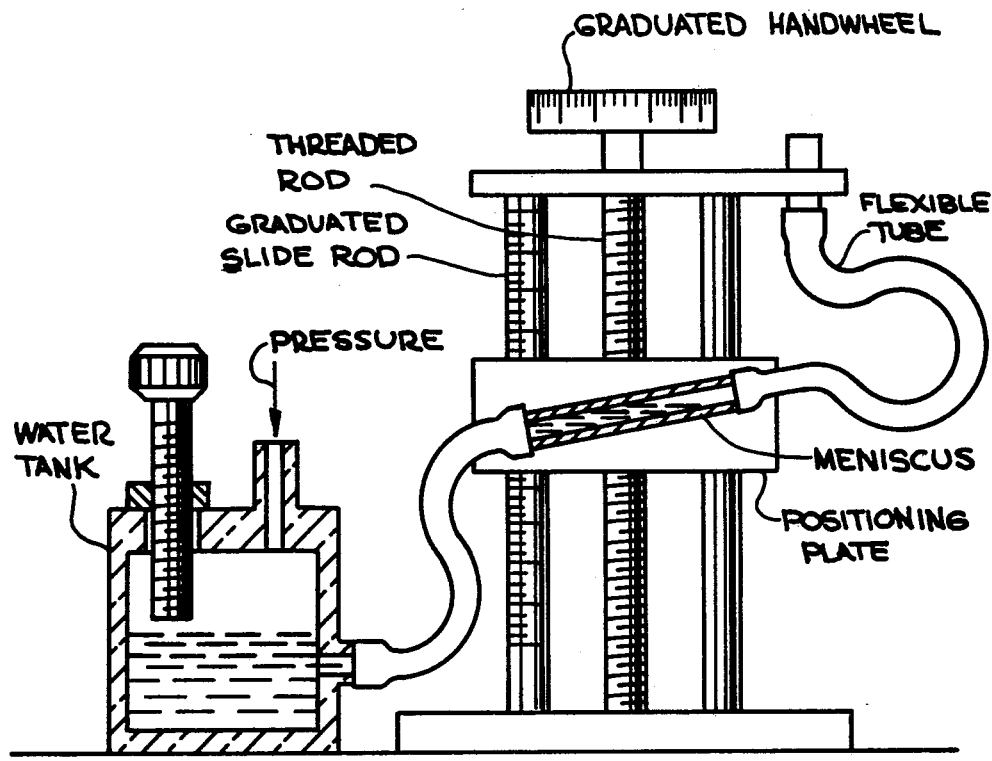
Figure 4:
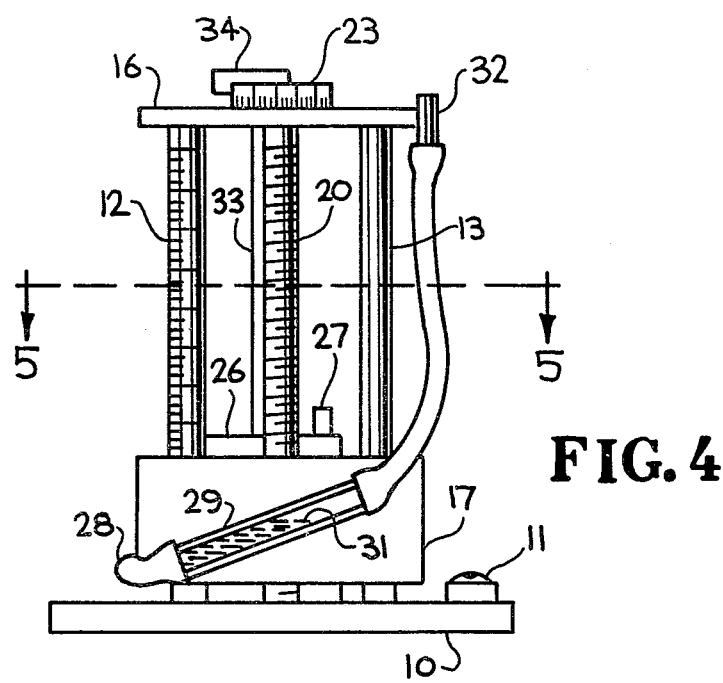
FIG. 4 illustrates an embodiment of the precision manometer gauge.
Figure 5:
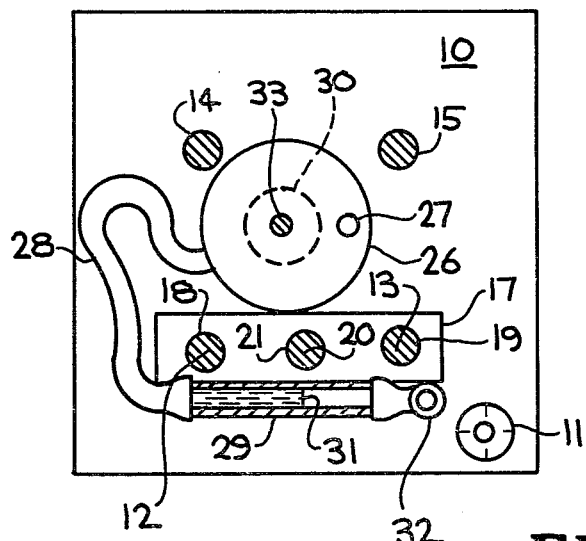
FIG. 5 is a view of the manometer gauge taken along the lines 5—5 of FIG. 4.

Referring now to the drawings, FIGS. 1–3 schematically illustrate the general operation of the invention, while FIGS. 4 and 5 illustrate an embodiment of a precision manometer gauge made in accordance with the invention.

Referring first to FIGS. 1–3, the major components of the apparatus are indicated by legend. As shown in FIG. 1, with a reservoir or water tank at ambient pressure or zero pressure differential, the meniscus of the water in a flexible open-end tubing is zeroed on a calibration line in a reference or monitoring section of the tube by adusting the water level in the reservoir, via a level adjustor or displacement means located within the reservoir. When pressure is applied to the reservoir via a pressure inlet, the water rises out of the monitoring section of the flexible tube, as shown in FIG. 2. By turning a graduated handwheel, which turns a precision threaded rod attached to a follower on the positioning plate, a known number of revolutions the positioning plate will be raised a known distance. The graduations on the wheel and rod enable exact measurement of positioning plate lift. The positioning plate is lifted until the meniscus is again aligned with the reference point or zeroed on the calibration line of the tube reference or monitoring section, as shown in FIG. 3.

When water is used as the fluid in the reservoir and flexible tubing, the manometer gauge measures pressures directly as inches of water gauge, illustrated on a graduated slide rod.

Referring now to the embodiment of the invention illustrated in FIGS. 4 and 5, the precision manometer gauge includes a support structure portion comprising a base plate 10 equipped with means for leveling same, such as a spirit level 11 and level adjustment members (not shown), four vertical members, slide rods, or posts 12, 13, 14 and 15, and a top member or plate 16, the posts being secured to base plate 10 and top member 16.

A positioning plate 17 is provided with a pair of holes 18 and 19 through which vertical members or post 12 and 13 are slidingly positioned. A screw 20 extends vertically through a threaded opening 21 in plate 17 and is threadably engaged therewith. Screw 20 rests on base plate 10 on one end thereof, while the opposite end extends through a bore hole in top plate 16 and is attached to a graduated handwheel 23. Thus, it is seen that as screw 20 is rotated by handwheel 23, positioning plate 17 is moved up or down in a vertical direction as it is guided by posts 12 and 13. Post 12 is of the graduated type, being formed with indicia (scale) for reading inches and tenths of inches, while graduated handwheel 23 is formed with indicia (scale) for reading hundredths and thousandths of an inch, as will be more fully explained hereinafter.

The liquid system portion of the manometer gauge comprises a reservoir 26 having a closed top, a fluid pressure inlet member or tube 27 extending through the top, the adapted to be connected to a source of pressure being measured, and a flexible tube 28 extending from a lower part of reservoir 26 to provide fluid communication with liquid in the reservoir. Tube 28 is formed with a straight reference or monitoring section 29 having a marking or indicator point 31 thereon, and an open end 32 which is retained in an upright position. The reference or monitoring section 29 of tube 28 is attached securely to positioning plate 18 along an acute angle of, for example, less than 30° from the horizontal. With this inclined arrangement of tube section 29, with small inclinations, the meniscus (liquid-air interface) of the liquid in tube 28 can be more accurately located at marking 31.

The calibrating mechanism of the manometer gauge includes a displacement member adopted to be immersed in controlled fashion in the liquid in reservoir 26. As here shown, the calibrating mechanism comprises a generally cylindrical displacement member 30, a rod 33 attached at its lower end to the displacement member 30, and a second handwheel 34 attached at its upper end. Rod 33 passes through the closed top of reservoir 26 in a slidable seal (not shown), and it also passes through the top member 16 in threadable engagement therewith.

In operation, a liquid (preferably water and small amounts of alcohol for wetting) is added to reservoir 26 by removal of the top, whereafter the top is secured and pressure inlet tube 27 open. Handwheel 23 is set on the zero position, and the meniscus will probably be some distance from marking 31 in monitor section 29 of flexible tube 28. The handwheel 34 is then rotated to adjust the amount of immersion of displacement memeber 30 in reservoir 26 via rod 33 until the position is reached where the meniscus is exactly positioned at mark 31, as illustrated in FIG. 1.

The inlet tube 27 is then connected, as by a tube, to the pressure to be measured, and liquid moves through flexible tube 28 until the pressure is equalized, as shown in FIG. 2. Handwheel 23 is then turned to elevate positioning plate 17 until the meniscus is again exactly positioned at mark 31, as shown in FIG. 3. The liquid head is then read from the scales (indicia) on rod 12 and handwheel 23.

The accuracy is obtained by utilizing a very accurate machine screw thread on rod 20 and within positioning plate 17 so that lash is substantially eliminated. For example, the screw threads are pitched so that five (5) turns per inch of liquid head is obtained. This will result in five (5) turns per inch of vertical travel. With this arrangement, one turn of handwheel 23 will provide a lift of 0.2 inch of positioning plate 17. This value is read from the scale on rod 12, the readings being taken from the top surface of positioning plate 17. Wheel 23, for example, is divided into twenties, with each twenty further marked into tens. In this way, the significant figures in the hundredths and in the thousandths can be read.

By adjusting the angle of the monitoring section 29 of tube 28 relative to the positioning plate 17, the sensitivity of vertical movement of liquid through the tube at the marking 31 may be increased.

By way of example to obtain a capability of measuring positive pressures up to about 18 inches of water, the reservoir 26 would have a 1140 ml capacity and contain about 335 ml of water and about two drops of alcohol for wetting, with the flexible tube 28 having an inside diameter of 6 mm.

It has thus been shown that the present invention provides a precision manometer gauge which is capable of accurately measuring small positive air pressures while also having the capability of measuring positive pressures up to about 18 inches of water. The instrument can be used as a reference standard as water is used as the measuring medium.

While a particular embodiment of the invention has been illustrated and described, modifications and changes will become apparent to those skilled in the art, and it is intended to cover in the appended claims all such modifications and changes as come within the scope of the claims.

What is claimed is:

1. An apparatus for measuring positive pressures comprising:
    a movable mounted positioning plate adapted to be moved along at least one graduated vertical member,
    means for moving said positioning plate along a vertical path, said moving means including a graduated handwheel,
    a closed reservoir adapted to contain a liquid and having means thereon through which a pressure to be measured is directed thereinto,
    means for changing the displacement of liquid in said reservoir, and
    a flexible tube operatively connected to said reservoir at one end for receiving liquid from said reservoir and being open at an opposite end, said flexible tube having a section thereof fixedly secured to said positioning plate at an angle from the horizontal, said section of tube having a marking thereon and constituting a monitoring section for indicating liquid level in said flexible tube when liquid is directed through said tube from said reservoir.

2. The apparatus of claim 1, wherein said moving means additionally includes a threaded rod secured to said graduated handwheel and extending through a threaded opening in said positioning plate along said vertical path.

3. The apparatus of claim 1, additionally including an adjustable base plate, a top plate, and a plurality of vertical members positioned between said base and top plates, one of said vertical members constituting said graduated vertical member, and
    wherein said positioning plate is provided with at least one opening through which said graduated vertical member extends.

4. The apparatus of claim 3, wherein said liquid displacement changing means comprises:
    a liquid displacement member positioned in said closed reservoir,
    a rod extending into said closed reservoir and attached at one end to said liquid displacement member, said rod being threaded at an opposite end section and extending through a threaded opening in said top plate and
    means secured to said opposite end for rotating said rod causing movement of said displacement member in said reservoir.

5. The apparatus of claim 1, wherein said monitoring section of said flexible tube is secured to said positioning plate at an acute angle from the horizontal.

6. The apparatus of claim 5, wherein said acute angle is less than about 30°.

7. The apparatus of claim 1, wherein said closed reservoir comprises a body portion and a removable top, wherein said liquid displacement changing means includes a rod member movable in liquid sealed relationship through said removable top, and wherein said means through which a pressure to be measured constitutes a pressure inlet member connected to said removable top.

8. The apparatus of claim 1, wherein said graduated vertical member is provided with indicia for reading inches and tenths of inches, and wherein said graduated handwheel is provided with indicia for reading hundredths and thousandths of an inch.

* * * * *